US012730669B2

(12) United States Patent
Liu et al.

(10) Patent No.: US 12,730,669 B2
(45) Date of Patent: Sep. 8, 2026

(54) SOFTWARE HOST CONSTRUCTION METHOD, SOFTWARE HOST CONSTRUCTION SYSTEM, SOFTWARE HOST, AND SIMULATION DEVICE

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 502 days.

(21) Appl. No.: 18/267,125

(22) PCT Filed: Sep. 5, 2022

(86) PCT No.: PCT/CN2022/116931
§ 371 (c)(1),
(2) Date: Jun. 14, 2023

(87) PCT Pub. No.: WO2023/093196
PCT Pub. Date: Jun. 1, 2023

(65) Prior Publication Data
US 2024/0118918 A1 Apr. 11, 2024

(30) Foreign Application Priority Data
Nov. 23, 2021 (CN) ......................... 202111395571.6

(51) Int. Cl.
*G06F 9/54* (2006.01)
*G06F 9/48* (2006.01)
*H04L 69/16* (2022.01)

(52) U.S. Cl.
CPC .................................... *G06F 9/485* (2013.01)

(58) Field of Classification Search
CPC . G06F 9/485; G06F 9/545; G06F 9/54; H04L 69/16
(Continued)

(56) References Cited

U.S. PATENT DOCUMENTS

2008/0222622 A1 9/2008 Lavoie et al.
2008/0306717 A1 12/2008 Kobayashi et al.
(Continued)

FOREIGN PATENT DOCUMENTS

CN 1940866 A 4/2007
CN 101782848 A 7/2010
(Continued)

OTHER PUBLICATIONS

Invincible Jack of All Trades, Communication Between Two Applications, 2014.
(Continued)

*Primary Examiner* — Pierre Vital
*Assistant Examiner* — Daniel Trainor
(74) *Attorney, Agent, or Firm* — Bayramoglu Law Offices LLC

(57) ABSTRACT

A software host construction method, a software host construction system, a software host, and a simulation device are provided. The software host construction method includes: performing, by a software platform, communication with external software according to a communication method of the external software; and using the external software as a subsidiary software of the software platform to construct the software host after the software platform communicates with the external software. It is realized that various industry software is subject to unified management through the software host, these industry software can be automatically run, stopped, and configured, and the communication between these industry software can be auto-
(Continued)

matically controlled to ensure that the requirement of co-simulation depending on these software can be effectively met.

9 Claims, 2 Drawing Sheets

(58) Field of Classification Search
USPC .......................................................... 718/100
See application file for complete search history.

(56) References Cited

U.S. PATENT DOCUMENTS

| | | | | |
|---|---|---|---|---|
| 2010/0318770 | A1 | 12/2010 | Lin et al. | |
| 2015/0067705 | A1* | 3/2015 | Oh | G06F 9/54 719/320 |
| 2019/0361688 | A1* | 11/2019 | Chigakkagari | G06F 8/60 |
| 2021/0105151 | A1 | 4/2021 | Ngo et al. | |
| 2021/0152626 | A1 | 5/2021 | Momchilov et al. | |

FOREIGN PATENT DOCUMENTS

| | | | |
|---|---|---|---|
| CN | 106250204 | A | 12/2016 |
| CN | 107479867 | A | 12/2017 |
| CN | 108196917 | A | 6/2018 |
| CN | 114064322 | A | 2/2022 |
| JP | H05204673 | A | 8/1993 |
| JP | H09101901 | A | 4/1997 |
| JP | 2008040983 | A | 2/2008 |
| JP | 2008515293 | A | 5/2008 |
| JP | 2010521033 | A | 6/2010 |
| JP | 2011081789 | A | 4/2011 |
| RU | 2639299 | C2 | 12/2017 |
| RU | 2654164 | C2 | 5/2018 |
| WO | 2021130500 | A1 | 7/2021 |

OTHER PUBLICATIONS

Wenyun Wang, et al., Vega Prime Development and Simulation Applications, 2017, No. 7-5643-5777-1.

George Shepherd, et al., Deep Analysis of MFC, 2003, No. 7-5083-1800-5.

Weiwei Li, Introduction to Computer Applications, 2019, No. 978-7-5647-7076-1.

Dongkui Mao, Fundamentals of Computer Software Technology, 2003, No. 7-5624-2759-3.

Little Evil, A program controls another window through the window handle, 2017, pp. 1-7, retrieved from: https://www.cnblogs.com/xielong/p/6692887.html.

The bright moon in the south of the city, What can you do with the window handle?, 2015, pp. 1-2, retrieved from: https://zhidao.baidu.com/question/1112274026588579459.html.

Z_Juan1, TCP, UDP transmission and multi-threaded and multi-process transmission, 2018, pp. 1-14, retrieved from: https://blog.csdn.net/Z_JUAN1/article/details/81362571.

Jimmy1224, Memory-mapped files for inter-process communication, 2019, pp. 1-5, retrieved from: https://blog.csdn.net/c_base_jin/article/details/102616458.

Dohyung Kim, et al., Parallel Co-simulation Using Virtual Synchronization with Redundant Host Execution, Proceedings of the Design Automation & Test in Europe Conference, 2006, pp. 1151-1156.

* cited by examiner

Performing, by a software platform, communication with an external software according to a communication method of the external software;

↓

Using the external software as a subsidiary software of the software platform to construct a software host after the software platform communicates with the external software.

SOFTWARE HOST CONSTRUCTION METHOD, SOFTWARE HOST CONSTRUCTION SYSTEM, SOFTWARE HOST, AND SIMULATION DEVICE

CROSS REFERENCE TO THE RELATED APPLICATIONS

This application is the national phase entry of International Application No. PCT/CN2022/116931, filed on Sep. 5, 2022, which is based upon and claims priority to Chinese Patent Application No. 202111395571.6, filed on Nov. 23, 2021, the entire contents of which are incorporated herein by reference.

TECHNICAL FIELD

The present invention belongs to the technical field of automobiles, in particular to a software host construction method, a software host construction system, a software host, and a simulation device.

BACKGROUND

Multi-industry software co-simulation is typically required to solve the problems of research and development or testing in the automobile industry. Before the co-simulation, a user needs to start each software one by one and completes the simulation-related configuration in each software. During the co-simulation, the user often needs to switch between different software to view the simulation status and data record information, or to dynamically configure these software. After the end of co-simulation, the user needs to stop the software one by one.

In the early period, running period, and end period of the prior co-simulation solution, the user needs to spend time to run, configure, and stop the software related to the co-simulation one by one, resulting in the problem of low efficiency of manual execution. Due to the uncertainty of the timing of manual operation, some software is started too late or stopped too early. Besides, the uncertainty of dynamic configuration time during running will also affect the accuracy and even the correctness of the simulation.

Therefore, based on the above technical problems, it is desirable to design a new software host construction method, software host construction system, software host, and simulation device.

SUMMARY

An objective of the present invention is to provide a software host construction method, a software host construction system, a software host, and a simulation device.

In order to solve the above technical problems, the present invention provides a software host construction method, including:

- performing, by a software platform, communication with external software according to a communication method of the external software; and
- using the external software as a subsidiary software of the software platform to construct a software host after the software platform communicates with the external software.

Further, the performing, by the software platform, of the communication with the external software according to the communication method of the external software includes:

- a communication kernel of the software platform includes a window message communication method, that is
- a communication is initiated by the communication kernel of the software platform, and the software platform first searches a window handle related to the external software, and controls, through the handle, a window position of the external software, a window size, a text input in a window, and a button event call in the window to realize display, hiding, position setting, and automatic control of the external software through the software platform.

Further, the performing, by the software platform, of the communication with the external software according to the communication method of the external software includes:

- a communication kernel of the software platform includes a pipeline communication method, that is
- a communication is initiated by the communication kernel of the software platform, the software platform first starts the software according to a mapping address of the external software, establishes a communication pipeline, and reads and writes data of the external software through the established pipeline to realize automatic start, automatic stop, and data communication of the external software through the software platform.

Further, the performing, by the software platform, of the communication with the external software according to the communication method of the external software includes:

- a communication kernel of the software platform includes a Transmission Control Protocol (TCP) and/or User Datagram Protocol (UDP) communication method, that is
- a local communication is initiated by the communication kernel of the software platform, the software platform establishes a TCP server and a UDP server locally on a computer, and the started external software communicates with the software host through a local loopback address.

Further, the performing, by the software platform, of the communication with the external software according to the communication method of the external software includes:

- a communication kernel of the software platform includes a Component Object Model (COM) communication method, that is
- the software platform acts as a COM client and accesses a COM server of the external software deployed on a local computer in an in-process or out-of-process manner to realize automatic start, automatic stop, command control, and data communication of the external software through the software platform.

Further, the performing, by the software platform, of the communication with the external software according to the communication method of the external software includes:

- a communication kernel of the software platform includes a file mapping communication method, that is
- a communication is initiated by the communication kernel of the software platform, data is exchanged with the external software by utilizing a memory-mapped file to realize data communication of the external software through the software platform.

Further, a method of using the external software as the subsidiary software of the software platform to construct the software host after the software platform communicates with the external software includes:

- after the software platform communicates with the external software, displaying, by the software platform, application program interfaces of all external software in respective sub-window position areas of an interface framework, and allowing a main interface of the external software to act as a sub-window in the software platform, so that the software platform acts as the software host, and the external software embedded in the software platform acts as the subsidiary software.

In the second aspect, the present invention further provides a software host construction system, including:

a communication module, through which a software platform communicates with external software according to a communication method of the external software; and an embedded module, through which the external software is used as a subsidiary software of the software platform to construct a software host after the software platform communicates with the external software.

In the third aspect, the present invention further provides a software host, including:

an interface framework and a communication kernel.

The communication kernel is configured to communicate with external software.

The interface framework is configured to display an application program interface of the external software communicating with the communication kernel.

In the fourth aspect, the present invention further provides a simulation device, including:

a software host and a control module.

The control module is configured to control the software host to perform co-simulation.

The advantages of the present invention are as follows: in the present invention, a software platform communicates with external software according to a communication method of the external software, and the external software is used as a subsidiary software of the software platform to construct the software host after the software platform communicates with the external software. It is realized that various industry software is subject to unified management through the software host, these industry software can be automatically run, stopped, and configured, and the communication between these industry software can be automatically controlled to ensure that the requirement of co-simulation depending on these software can be effectively met.

Other features and advantages of the present invention will be described in the subsequent specification and will act as apparent in part from the specification or understood through the implementation of the present invention. The objective and other advantages of the present invention are realized and obtained by the structure specifically pointed out in the specification and the drawings.

In order to make the above-mentioned objectives, features, and advantages of the present invention more apparent and easier to understand, the preferred embodiments are given below and described in detail in conjunction with the drawings.

BRIEF DESCRIPTION OF THE DRAWINGS

In order to illustrate the specific embodiments of the present invention or the technical solution more clearly in the prior art, the drawings that need to be used in the description of the specific embodiments or prior art will be briefly described below. Apparently, the drawings described below are some embodiments of the present invention, and for those having ordinary skill in the art, other drawings can be obtained according to these drawings without creative effort.

DETAILED DESCRIPTION OF THE EMBODIMENTS

In order to make the objective, technical solution, and advantages of the embodiments of the present invention clearer, the technical solution of the present invention will be described clearly and completely below in conjunction with the drawings. Apparently, the described embodiments are part of the embodiments of the present invention, not all embodiments. Based on the embodiments of the present invention, all other embodiments obtained by those having ordinary skill in the art without creative effort shall fall within the scope of protection of the present invention.

Figures 1, 2:
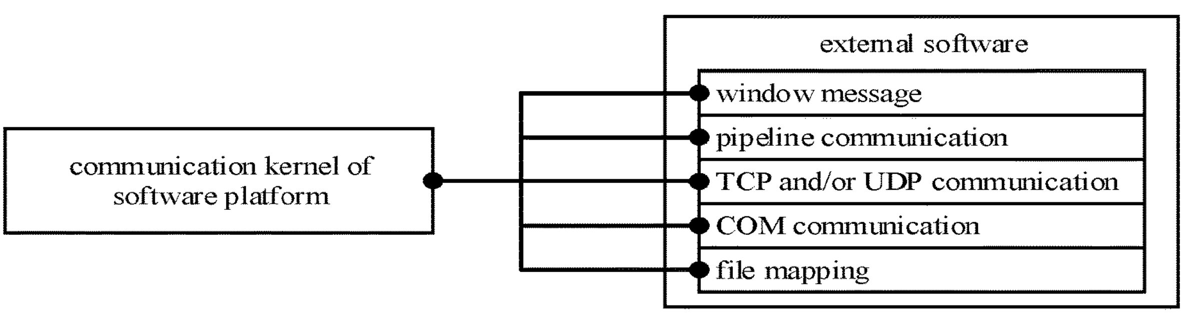
FIG. 1 is a flowchart of a software host construction method of the present invention.
FIG. 2 is a schematic diagram of the software inter-process communication method adopted by a software host communication kernel of the present invention.

As shown in FIG. 1, the present embodiment provides a software host construction method, including: performing, by a software platform, communication with external software according to a communication method of the external software; and using the external software as a subsidiary software of the software platform to construct a software host after the software platform communicates with the external software. It is realized that various industry software is subject to unified management through the software host, these industry software can be automatically run, stopped, and configured, and the communication between these industry software can be automatically controlled to ensure that the requirement of co-simulation depending on these software can be effectively met.

As shown in FIG. 2, in the present embodiment, the method of performing, by the software platform, communication with the external software according to the communication method of the external software is implemented as follows: a communication kernel of the software platform includes at least five methods of inter-process communication, namely window message, pipeline communication, TCP and/or UDP communication, COM communication, and file mapping. The communication kernel of the software platform includes a window message communication method, that is, the communication is initiated by the communication kernel of the software platform, and the software platform first searches a window handle related to the external software, and controls, through the handle, a window position of the external software, a window size, a text input in a window, and a button event call in the window to realize display, hiding, position setting, automatic control, and other functions of the external software through the software platform (software host).

In the present embodiment, the method of performing, by the software platform, communication with the external software according to the communication method of the external software is implemented as follows: the communication kernel of the software platform includes a pipeline communication method, that is, the communication is initiated by the communication kernel of the software platform, the software platform first starts the software according to a mapping address of the external software, establishes a communication pipeline, and reads and writes the data of the external software through the established pipeline to realize automatic start, automatic stop, data communication, and other functions of the external software through the software platform.

In the present embodiment, the method of performing, by the software platform, communication with the external software according to the communication method of the external software is implemented as follows: the communication kernel of the software platform includes a TCP and/or UDP communication method, that is, the local communication is initiated by the communication kernel of the software platform, the software platform establishes a TCP server and a UDP server locally on a computer, and the started external software communicates with the software host through a local loopback address.

In the present embodiment, the method of performing, by the software platform, communication with the external software according to the communication method of the external software is implemented as follows: the communication kernel of the software platform includes a COM communication method, that is, the software platform acts as a COM client and accesses a COM server of the external software deployed on the local computer in an in-process or out-of-process manner to realize automatic start, automatic stop, command control, data communication, and other functions of the external software through the software platform.

In the present embodiment, the method of performing, by the software platform, communication with the external software according to the communication method of the external software is implemented as follows: the communication kernel of the software platform includes a file mapping communication method, that is, the communication is initiated by the communication kernel of the software platform, the data is exchanged with the external software by utilizing a memory-mapped file to realize the data communication function of the external software through the software platform.

Figure 3:
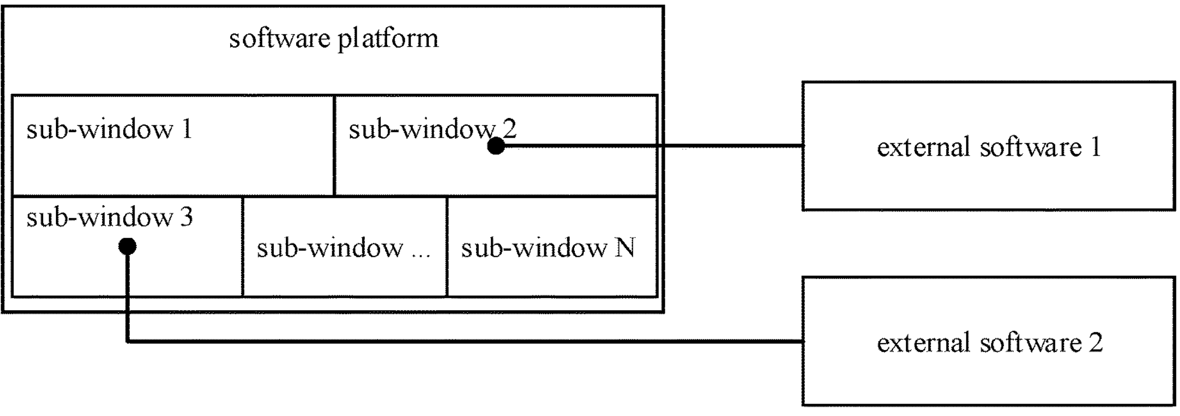
FIG. 3 is a schematic diagram of a software host interface framework of the present invention.

As shown in FIG. 3, in the present embodiment, the method of using the external software as the subsidiary software of the software platform to construct the software host after the software platform communicates with the external software includes: after the software platform communicates with the external software, displaying, by the software platform, application program interfaces of all external software in respective sub-window position areas of an interface framework, and allowing the main interface of the external software to act as a sub-window in the software platform, so that the software platform acts as the software host, and the external software embedded in the software platform acts as the subsidiary software. The software host includes two parts, namely a software host interface framework and a software host communication kernel. The interface framework of the software host includes a plurality of sub-window position areas. The number and size of these position areas can be set by a user in a software platform interface. The sub-window position area can display the sub-window of the software platform itself, and can also display an application program interface of any external software. If the application program interface of the external software is displayed, the main interface of the external software will act as a sub-window in the software platform. In this case, the software platform acts as the software host, and the external software embedded in the software platform acts as the subsidiary software. One or more sub-window position areas may be arranged, so that all external software associated with the software platform can be used as sub-windows to be simultaneously displayed in the software platform. The software host can save the sub-window position areas of a user configuration and automatically load the configuration at the next startup, thus ensuring the persistence of the user configuration. The data collaboration between multiple industry software is effectively managed by introducing the software host, so that the user who depends on simultaneous running of these software is unnecessary to start, load, configure, and stop each software, which improves the efficiency of the user and reduces the risk of errors. This solves the problem of low efficiency and high risk of error caused by the need to start, stop, and repeatedly configure multiple software interfaces when the user uses various industry software simultaneously, so that the user only needs to operate on the software host interface to view all relevant software interfaces simultaneously and configure these software simultaneously, which highly improves the efficiency of the user.

Figure 4:
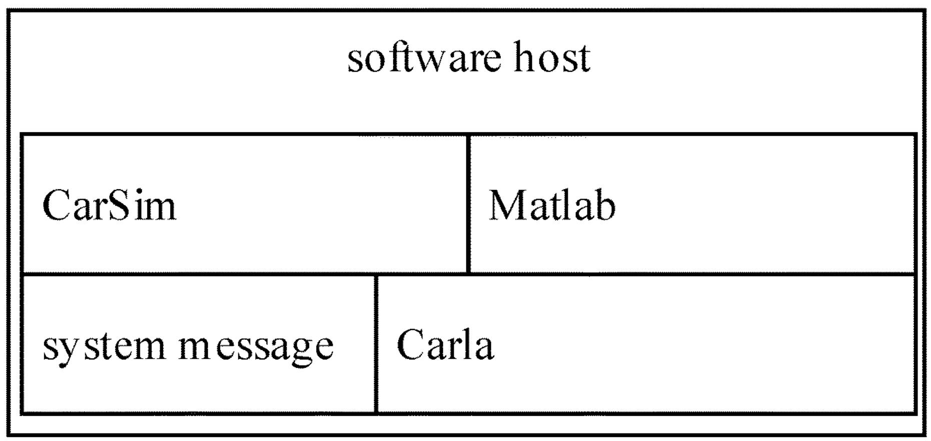
FIG. 4 is a schematic diagram of a multi-industry software co-simulation method based on a software host of the present invention.

Specifically, as shown in FIG. 4, the present embodiment provides a multi-industry software co-simulation method based on a software host, which integrates three kinds of industry software that the automobile industry hardware-in-the-loop (HIL) testing depends on, namely CarSim, Matlab and Carla, to automatically control the data communication between the three kinds of software under one software platform to realize the co-simulation. The main interface of the software host provides an interface framework for simultaneously displaying four windows, in which the upper left corner shows CarSim software, the upper right corner shows Matlab software, the lower left corner shows a system message window of the software host, and the lower right corner shows Carla software. The CarSim software is configured to calculate a vehicle dynamics model. Since the CarSim software supports COM calls, the software host can automatically start, configure, and stop the CarSim software through the COM communication mode. The Matlab software is configured to logically execute a controller algorithm. Since the Matlab software supports COM calls, the software host can automatically start, configure, and stop the Matlab software through the COM communication mode. The Carla software is configured to display the scene. Since the Carla software supports TCP communication, the software host can control the Carla software in real time through the TCP communication mode, and can simultaneously and automatically start and stop the Carla software though the pipeline communication mode. When the software host starts the co-simulation, through the aforementioned communication modes, the interface framework of the four windows can simultaneously display the three kinds of software and the system message window of the software host. When the co-simulation is stopped, the interface framework of the four windows can automatically stop the three kinds of software and automatically stop the system message window of the software host.

The present embodiment further provides a software host construction system, including: a communication module, through which a software platform communicates with external software according to a communication method of the external software; and an embedded module, through which the external software is used as a subsidiary software of the software platform to construct a software host after the software platform communicates with the external software. The function of each module is already described in detail in the software host construction method.

The present embodiment further provides a software host, including an interface framework (software host interface framework) and a communication kernel (software host communication kernel). The communication kernel is configured to communicate with external software, and the interface framework is configured to display an application program interface of the external software communicating with the communication kernel. The specific functions of the interface framework and the communication kernel are already described in detail in the software host construction method.

The present embodiment further provides a simulation device, including a software host and a control module. The control module is configured to control the software host to perform co-simulation. The software host is the aforementioned software host. The data collaboration between multiple industry software is effectively managed by introducing the software host, so that the user who depends on simultaneous running of these software is unnecessary to start, load, configure, and stop each software, which improves the efficiency of the user and reduces the risk of errors. This solves the problem of low efficiency and high risk of error caused by the need to start, stop, and repeatedly configure multiple software interfaces when the user uses various industry software simultaneously, so that the user only needs to operate on the software host interface to view all relevant software interfaces simultaneously and configure these software simultaneously, which highly improves the efficiency of the user.

To sum up, in the present invention, a software platform communicates with external software according to a communication method of the external software, and the external software is used as a subsidiary software of the software platform to construct the software host after the software platform communicates with the external software. It is realized that various industry software is subject to unified management through the software host, these industry software can be automatically run, stopped, and configured, and the communication between these industry software can be automatically controlled to ensure that the requirement of co-simulation depending on these software can be effectively met. The data collaboration between multiple industry software is effectively managed by introducing the software host, so that the user who depends on simultaneous running of these software is unnecessary to start, load, configure, and stop each software, which improves the efficiency of the user and reduces the risk of errors. This solves the problem of low efficiency and high risk of error caused by the need to start, stop, and repeatedly configure multiple software interfaces when the user uses various industry software simultaneously, so that the user only needs to operate on the software host interface to view all relevant software interfaces simultaneously and configure these software simultaneously, which highly improves the efficiency of the user.

In several embodiments provided in the present invention, it should be understood that the devices and method disclosed can also be implemented in other ways. The device embodiments described above are only illustrative. For example, the flow chart and block diagram in the drawings show the possible architecture, functions and operations of devices, methods, and computer program products according to multiple embodiments of the present invention. At this point, each box in the flow chart or block diagram may represent a part of a module, a program segment, or a code, and the part of the module, the program segment, or the code contains one or more executable instructions for implementing a specified logical function. It should also be noted that in some alternative implementations, the functions marked in the box may also occur in an order different from that noted in the drawings. For example, two consecutive boxes can actually be executed basically in parallel, and they can sometimes be executed in the opposite order, which depends on the functions involved. It should also be noted that each box in the block diagram and/or flow chart, and the combination of blocks in the block diagram and/or flow chart, may be implemented by a dedicated hardware-based system that performs a specified function or action, or by a combination of dedicated hardware and computer instructions.

In addition, each functional module in each embodiment of the present invention can be integrated to form an independent part, or each module can exist independently, or two or more modules can be integrated to form an independent part.

If the function is implemented in the form of a software function module and sold or used as an independent product, it can be stored in a computer-readable storage medium. Based on this understanding, the technical solution of the present invention, in essence, is that the part that contributes to the prior art or a part of the technical solution can be reflected in the form of a software product. The computer software product is stored in a storage medium and includes a plurality of instructions to allow a computer device (which can be a personal computer, a server, or network equipment, etc.) to perform all or part of the steps of the method described in each embodiment of the present invention. The aforementioned storage medium includes a USB flash drive, a mobile hard disk drive, a read-only memory (ROM), a random access memory (RAM), a magnetic disk, an optical disc, and other media that can store program codes.

Taking the above ideal embodiments according to the present invention as inspiration, through the above explanation content, those skilled in the art may make various changes and modifications without deviating from the scope of the technical idea of the present invention. The technical scope of the present invention is not limited to the contents of the specification, but must be determined according to the scope of the claims.

What is claimed is:

1. A software host construction method, comprising:

performing, by a communication kernel of a software platform, communication with external software according to a communication method of the external software; and using the external software as a subsidiary software of the software platform to construct a software host after the software platform communicates with the external software;

wherein the using the external software as the subsidiary software comprises:

displaying a main interface of the external software as a sub-window within an interface framework of the software platform such that the main interface of the external software is embedded in the software platform; and displaying main interfaces of a plurality of different external software simultaneously in respective sub-window position areas of the interface framework on a same display screen, so that the software platform acts as the software host and each of the external software displayed as the sub-window acts as the subsidiary software of the software platform.

2. The software host construction method according to claim 1, wherein the performing, by the software platform, of the communication with the external software according to the communication method of the external software comprises:

the communication kernel of the software platform comprises a window message communication method, wherein a communication is initiated by the communication kernel of the software platform, and the software platform first searches a window handle related to the external software, and controls, through the window handle, a window position of the external software, a window size, a text input in a window, and a button event call in the window to realize display, hiding, position setting, and automatic control of the external software through the software platform.

3. The software host construction method according to claim 1, wherein the performing, by the software platform, of the communication with the external software according to the communication method of the external software comprises:

the communication kernel of the software platform comprises a pipeline communication method, wherein a communication is initiated by the communication kernel of the software platform, the software platform first starts the external software according to a mapping address of the external software, establishes a communication pipeline, and reads and writes data of the external software through the communication pipeline to realize automatic start, automatic stop, and data communication of the external software through the software platform.

4. The software host construction method according to claim 1, wherein the performing, by the software platform, of the communication with the external software according to the communication method of the external software comprises:

the communication kernel of the software platform comprises a Transmission Control Protocol (TCP) and/or User Datagram Protocol (UDP) communication method, wherein a local communication is initiated by the communication kernel of the software platform, the software platform establishes a TCP server and a UDP server locally on a computer, and the started external software communicates with the software host through a local loopback address.

5. The software host construction method according to claim 1, wherein the performing, by the software platform, of the communication with the external software according to the communication method of the external software comprises:

the communication kernel of the software platform comprises a Component Object Model (COM) communication method, wherein the software platform acts as a COM client and accesses a COM server of the external software deployed on a local computer in an in-process or out-of-process manner to realize automatic start, automatic stop, command control, and data communication of the external software through the software platform.

6. The software host construction method according to claim 1, wherein the performing, by the software platform, of the communication with the external software according to the communication method of the external software comprises:

the communication kernel of the software platform comprises a file mapping communication method, wherein a communication is initiated by the communication kernel of the software platform, data is exchanged with the external software by utilizing a memory-mapped file to realize data communication of the external software through the software platform.

7. A software host construction system, comprising:

a software platform executing on at least one processor;

a communication module comprising computer-executable instructions stored on a non-transitory computer-readable medium and executed by the at least one processor to implement a communication kernel, wherein the communication kernel initiates communication with external software according to a communication method of the external software, the communication method comprises at least one of: (i) window message communication by searching a window handle of the external software and controlling, via the handle, a window position, a window size, a text input, and a button event call; (ii) Component Object Model (COM) communication wherein the software platform acts as a COM client accessing a COM server of the external software deployed on a local computer in an in-process or out-of-process manner to realize automatic start, automatic stop, command control, and data communication; (iii) Transmission Control Protocol (TCP) and/or User Datagram Protocol (UDP) local communication wherein the software platform establishes a local TCP server and a local UDP server and the external software communicates with the software host through a local loopback address; (iv) pipeline communication wherein the software platform starts the external software according to a mapping address, establishes a communication pipeline, and reads and writes data of the external software through the communication pipeline; and (v) file mapping communication wherein data is exchanged using a memory-mapped file; and an embedded module comprising computer-executable instructions stored on the non-transitory computer-readable medium and executed by the at least one processor, wherein through the embedded module, the external software is used as a subsidiary software of the software platform to construct a software host after the software platform communicates with the external software, wherein using the external software as the subsidiary software comprises: displaying a main interface of the external software as a sub-window within an interface framework of the software platform such that the main interface of the external software is embedded in the software platform, and displaying main interfaces of a plurality of different external software simultaneously in respective sub-window position areas of the interface framework on a same display screen, so that the software platform acts as the software host and each of the external software displayed as the sub-window acts as the subsidiary software of the software platform.

8. A software host, comprising:

an interface framework and a communication kernel;

wherein the communication kernel is configured to communicate with external software; and the interface framework is configured to display a main interface of the external software as a sub-window within the interface framework of a software platform such that the main interface of the external software is embedded in the software platform, and display main interfaces of a plurality of different external software simultaneously in respective sub-window position areas of the interface framework on a same display screen, so that the software platform acts as the software host and each of the external software displayed as the sub-window acts as a subsidiary software of the software platform.

9. A simulation device, comprising:

a software host comprising an interface framework, and a control module comprising computer-executable instructions stored on a non-transitory computer-readable medium and executed by at least one processor;

wherein the interface framework is configured to display a main interface of an external software as a sub-window within the interface framework of a software platform such that the main interface of the external software is embedded in the software platform, and display main interfaces of a plurality of different external software simultaneously in respective sub-window position areas of the interface framework on a same display screen, so that the software platform acts as the software host and each of the external software displayed as the sub-window acts as a subsidiary software of the software platform;

wherein the control module is configured to control the software host to perform a co-simulation by automatically starting and stopping multiple external simulation software, defining data relationships among the multiple external simulation software, and controlling a starting order, a communication kernel communicating with the external simulation software according to an external software's communication method comprising at least one of window message communication, COM communication, TCP/UDP local loopback communication, pipeline communication, or file mapping communication.

* * * * *